United States Patent [19]
Oliver

[11] Patent Number: 4,766,354
[45] Date of Patent: Aug. 23, 1988

[54] INDEPENDENT TOP/BOTTOM PINCUSHION CORRECTION

[75] Inventor: Kirk Oliver, Forest Park, Ill.

[73] Assignee: Zenith Electronics Corporation, Glenview, Ill.

[21] Appl. No.: 694

[22] Filed: Jan. 6, 1987

[51] Int. Cl.⁴ .............................................. H01J 29/56
[52] U.S. Cl. .................................................... 315/371
[58] Field of Search ........................................ 315/371

[56] References Cited

U.S. PATENT DOCUMENTS 3,995,196  11/1976  Lehnert ................................ 315/371
4,093,895  6/1978   Collette ............................... 315/371
4,395,662  7/1983   Sexton ................................. 315/371
4,496,882  1/1985   Oliver et al. ........................ 315/371

*Primary Examiner*—Theodore M. Blum
*Assistant Examiner*—David Cain

[57] ABSTRACT

Top and bottom pincushion correction signals with separately controllable amplitude, phase and tilt are provided. A switching signal developed from the vertical ramp operates a plurality of switches for selectively applying the top and bottom correction signals to the carrier input of a multiplier. The modulator input of the multiplier is supplied with the vertical ramp and the output of the multiplier consists of a conventional "bow tie" correction signal with each half of the bow tie being separately controllable.

4 Claims, 1 Drawing Sheet

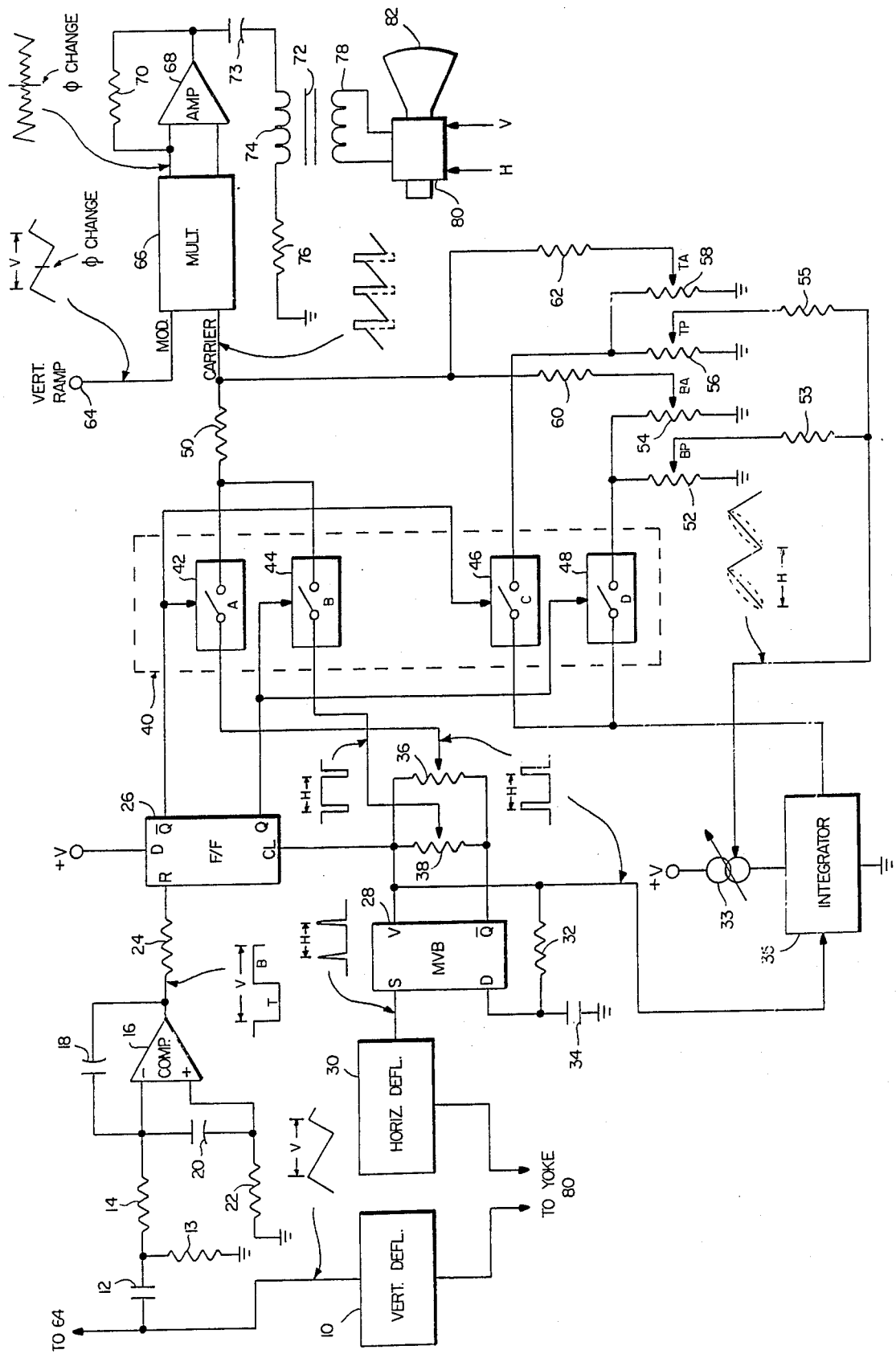

INDEPENDENT TOP/BOTTOM PINCUSHION CORRECTION

CROSS REFERENCE TO RELATED APPLICATIONS

This invention is related to application Ser. No. 001,060, filed 1/6/87 D5585), entitled ERROR SIGNAL CANCELLATION FOR TOP/BOTTOM PINCUSHION CORRECTION CIRCUIT, in the name of Kirk Oliver and assigned to Zenith Electronics Corporation.

BACKGROUND OF THE INVENTION AND PRIOR ART

As is well-known in the television art, the raster or deflection pattern produced on a spherical face of a cathode ray tube (CRT) suffers pincushion distortion as the center of deflection of the electron beam deviates from the center of curvature of the screen. With non-spherically faced CRT's, the effect of pincushion distortion is more pronounced. Trapezoidal and other types of distortion are also introduced if the yoke (deflection winding structure) is not accurately positioned on the neck of the CRT. Compounding the problem, is the multi-gun shadow mask type of CRT which requires that the plural beams from the electron guns converge at the phosphor target for color purity. The distortion correction circuits of the prior art add appropriate currents to the deflection yokes for straightening the top/-bottom, and left and right sides of the scanned raster. As will be apparent to those skilled in the art, the yoke structure itself may be designed to compensate for a portion of the pincushion error. It is common to incorporate a combination of mechanical correction in the yoke with electrical pincushion correction circuitry.

With the ever-increasing use of CRT's in monitor applications, where data is displayed rather than video or picture information, the constraints imposed upon the degree of pincushion distortion, misconvergence and other forms of distortion have become much more rigid. In monitor applications, for example, it is imperative that the edges of the raster be capable of close control (as to size and linearity) to assure a display field having correct dimensions and straight sides.

The circuits of the prior art develop pincushion correction signals that generate parabolic yoke currents, with controllable phase, amplitude and tilt characteristics, for affecting both the top and the bottom of the raster in substantially the same way. These circuits have been generally satisfactory for use with less stringent television displays, but require excessive setup time (including careful yoke positioning adjustments) to meet the more exacting standards for CRT raster displays in monitors. Further, the problem is exacerbated with color tubes of the flat tension mask variety which have a flat faceplate and an in-line gun structure and wherein yoke construction and positioning may be compromised to enhance beam convergence throughout the raster. It would be extremely beneficial to provide pincushion circuitry having independent control effects at the top and the bottom of the raster.

OBJECTS OF THE INVENTION

A principal object of the invention is to provide a novel top/bottom pincushion correction circuit.

Another object of the invention is to provide a method and apparatus for independently correcting a raster for top and bottom pincushion distortion.

A further object of the invention is to provide an improved top/bottom pincushion correction circuit that enables rapid and accurate raster correction on the CRT.

BRIEF DESCRIPTION OF THE DRAWING

These and other objects and advantages of the invention will be apparent upon reading the following description in conjunction with the drawing, the single FIGURE of which is a combined block and schematic diagram of the pincushion correction circuit of the invention.

DESCRIPTION OF THE PREFERRED EMBODIMENT

Referring to the single FIGURE of the drawing, a source of vertical deflection signal 10 and a source of horizontal deflection signal 30 are illustrated. A vertical ramp signal output from vertical deflection signal source 10 is coupled through a capacitor 12 and a resistor 14 to the negative input of a comparator 16. A resistor 13 connects the junction of capacitor 12 and resistor 14 to ground. A capacitor 20 interconnects the negative and positive inputs of comparator 16, and its positive input is returned to ground through a resistor 22. A feedback capacitor 18 connects the output of comparator 16 with its negative input. A group of associated waveforms is located around the circuit diagram to assist in understanding the invention. The output of comparator 16, which consists of a square wave having a period equal to the period of the vertical ramp signal, is connected through a resistor 24 to the reset ($\overline{R}$) terminal of a flip-flop 26. Flip-flop 26 has its Q and $\overline{Q}$ outputs coupled for controlling a plurality of switches 42, 44, 46 and 48 labelled A, B, C and D, respectively. As indicated by the dashed line block 40, the bilateral CMOS switches are conveniently packaged as an integrated circuit and commercially available under the designation MC14066. Switches A and C are simultaneously operated in response to a signal at the $\overline{Q}$ output of flip-flop 26 and switches B and D are operated in response to a signal at the Q output of flip-flop 26. As will be seen, these switch pairs are operated to selectively couple first and second, different, pincushion correction signals for application to a deflection yoke. These correction signals individually correspond to the top and the bottom of the raster. Flip-flop 26 is thus seen to provide a switching signal having a switching transition at the center of the CRT raster, i.e., at the zero crossing of the vertical ramp signal.

Horizontal deflection signal source 30 supplies horizontal rate pulses to the set (S) input terminal of another flip-flop 28, which is operated as a one-shot multivibrator by virtue of a timing network consisting of resistor 32 and capacitor 34 coupled between its Q output and its D input. The output pulses are coincident with the leading edge of the horizontal rate pulses, but of shorter duration. This prevents distortion at the left edge of the raster. The Q output of flip-flop 28 supplies the clock (CL) input terminal of flip-flop 26 to permit changes in the state of flip-flop 26 only during occurrence of horizontal retrace. Flip-flop 26 has its R terminal supplied with a vertical rate pulse and, therefore, flip-flop 26 only switches at the zero crossing of the vertical signal (corresponding to the center of the CRT raster) and only during horizontal retrace. Therefore, the switching of the outputs of flip-flop 26 (and the pincushion correction signals) is not visible on the CRT display since switching can only occur during the retrace portion of the horizontal deflection signal. The Q and $\bar{Q}$ outputs of flip-flop 28 have a pair of potentiometers 36 and 38 coupled thereacross with the sliders thereof connected to switches A and B, respectively. As indicated by the adjacent waveforms, the signal applied to switch A is a positive pulse waveform of horizontal frequency and variable amplitude while that applied to switch B is of opposite polarity. It will be appreciated, however, that the waveforms merely illustrate the range and polarity of available signals for application to switches A and B. The actual signals may each lie between the positive and negative extremes shown, depending upon the nature of the correction required at the top and the bottom of the raster. As is well-known, these pulses will result in introduction of a tilt characteristic to the pincushion correction signal applied to the yoke. The key point is that the pulses are each independent of each other and may, therefore, be of different amplitude and polarity.

The Q output of flip-flop 28 is also coupled to an integrator network 35 that is supplied from a variable current source 33. The integrator network develops a ramp voltage from the horizontal rate pulse input and supplies it to switches C and D. The output of switch D is coupled to a pair of potentiometers 52 and 54, labelled BP and BA, denoting bottom phase and bottom amplitude, respectively. The output of switch C is similarly connected to a pair of potentiometers 56 and 58, labelled TP and TA, denoting top phase and top amplitude, respectively. The sliders of potentiometers 52 and 56 are connected through resistors 53 and 55, respectively, in a feedback arrangement and coupled over a lead 37 for controlling current source 33. The fed back voltage ramps cause a corresponding change in current supplied by current source 33 and result in a non-linear waveshape (defined as "phase") change in the ramp signal output. As illustrated by the dashed lines in the waveform adjacent the output of integrator 35, the ramp signal output takes on either the upward or downward bowed form. This waveform and the other waveforms developed by the circuit of the invention are well-known in the art.

The sliders on potentiometers 54 and 58 are coupled through respective resistors 60 and 62 to the carrier input of a multiplier 66. This input is also supplied with the output of switches A and B through a resistor 50. Thus, the signal at the carrier input of multiplier 66 consists of a horizontal rate pulse riding on a horizontal rate ramp with the ramp amplitude and phase and the pulse amplitude and polarity being variable. The input signal may be considered as having two portions, the first portion being determined when switches A and C are closed and being tailored for correcting the top half of the raster and the second portion being determined when switches B and D are closed for correcting the bottom half of the raster. The signal input to the modulating terminal of multiplier 66 is taken from terminal 64 which is connected to vertical deflection circuit 10 and consists of a vertical ramp. Multiplier 66 functions to amplitude modulate the signal appearing at its carrier input with the signal appearing at its modulator input. Multiplier 66 is a conventionally available integrated circuit designated as M01496 and its operating characteristics are well-known. The multiplier produces a differential output signal that is coupled to an amplifier 68 having a feedback resistor 70. The output signal is seen to be the conventional "bow tie" pincushion correction signal that undergoes a change in phase (4) in the center. Amplifier 68 supplies a primary winding 74 on a pincushion correction transformer 72. Winding 74 is returned to ground through a current limiting resistor 76. The secondary winding 78 of transformer 72 is connected in series with the vertical winding (not shown) in yoke 80, which is appropriately positioned on the neck of a CRT 82.

Operation of multiplier 66 in developing the bow tie pincushion correction signal is conventional. The vertical rate ramp applied to the modulator input of multiplier 66 goes through a zero transition at Q, corresponding to the center of the CRT raster. The carrier input of multiplier 66 is supplied with a horizontal rate ramp with horizontal rate pulses (of either polarity) and variable amplitude. The input signals are multiplied to develop the bow tie top/bottom pincushion correction signal. Since flip-flop 26 selectively couples separate correction signals, via CMOS switches 40, to the carrier input of multiplier 66, the two halves of the bow tie correction signal may be independently controlled and thus permitting independent top/bottom correction.

With the above-described arrangement, separate controls control the three characteristics of the pincushion correction signals applied to multiplier 66, that is, the amplitude, phase and tilt of the ramp and separate pincushion correction signals are available for independent top and bottom correction. Since the controls are not interactive, fast and accurate correction of top and bottom pincushion raster distortion are possible.

It is recognized that numerous changes in the described embodiment of the invention will be apparent to those skilled in the art without departing from its true spirit and scope. The invention is to be limited only as defined in the claims.

What is claimed is:

1. A pincushion correction system for controlling the raster on a cathode ray tube comprising:
   multiplier means having first and second inputs;
   means for producing a vertical ramp signal coupled to said first input of said multiplier means;
   means for generating a horizontal rate pincushion correction signal;
   a pair of separate adjustment means coupled between said generating means and said second input of said multiplier means for providing two independent, adjustable, horizontal rate pincushion correction signals; and
   switch means for selectively activating said adjustment means for independently controlling pincushion correction of the top and bottom portions of said raster with said two correction signals, respectively.

2. A pincushion correction system for controlling the raster on a cathode ray tube comprising:
   multiplier means having first and second inputs;
   means for producing a vertical ramp signal coupled to said first input of said multiplier means;
   first means for generating a horizontal rate pincushion correction signal;
   first and second adjustment means coupled between said first means and said second input of said multiplier means for providing first and second independent, adjustable, horizontal rate pincushion correction signals;

second means for generating another horizontal rate pincushion correction signal;

third and fourth adjustment means coupled between said second means and said second input of said multiplier means for providing third and fourth independent, differentially adjustable, horizontal rate pincushion correction signals; and switch means for selectively activating both said first and said third adjustment means, and both said second and said fourth adjustment means, respectively, for independently controlling pincushion correction of the top and bottom portions of said raster.

3. The system of claim 2 wherein said switch means are operated at a vertical rate and wherein said adjustment means comprise potentiometers.

4. The system of claim 3 wherein said switch means comprises a flip/flop and further including CMOS type switches operated by the Q and $\overline{Q}$ outputs of said flip/flop for connecting said adjustment means and said first and said second means.

* * * * *